(12) United States Patent  (10) Patent No.: US 8,793,159 B2
Chen et al.  (45) Date of Patent: Jul. 29, 2014

(54) METHOD AND APPARATUS FOR PROVIDING CARD-LESS REWARD PROGRAM

(75) Inventors: Dazhi Chen, New York, NY (US); Tao Yang, Sunnyvale, CA (US)

(73) Assignee: DailyGobble, Inc., New York, NY (US)

( * ) Notice: Subject to any disclaimer, the term of this patent is extended or adjusted under 35 U.S.C. 154(b) by 356 days.

(21) Appl. No.: 13/152,308

(22) Filed: Jun. 3, 2011

(65) Prior Publication Data

US 2012/0203614 A1    Aug. 9, 2012

Related U.S. Application Data (60) Provisional application No. 61/439,956, filed on Feb. 7, 2011.

(51) Int. Cl.
*G06Q 30/00* (2012.01)
*G06Q 30/02* (2012.01)

(52) U.S. Cl.
CPC ........ *G06Q 30/0226* (2013.01); *G06Q 30/0233* (2013.01); *G06Q 30/0207* (2013.01)
USPC .................... 705/14.27; 705/14.33; 705/14.1

(58) Field of Classification Search
USPC ...................................................... 705/14.27
See application file for complete search history.

(56) References Cited

U.S. PATENT DOCUMENTS

| | | | | |
|---|---|---|---|---|
| 4,713,761 | A * | 12/1987 | Sharpe et al. | 705/30 |
| 5,910,988 | A * | 6/1999 | Ballard | 705/75 |
| 6,735,572 | B2 * | 5/2004 | Landesmann | 705/14.39 |
| 2004/0260604 | A1 * | 12/2004 | Bedingfield, Sr. | 705/14 |
| 2006/0089907 | A1 | 4/2006 | Kohlmaier et al. | |
| 2006/0095504 | A1 | 5/2006 | Gelsey | |
| 2007/0008574 | A1 | 1/2007 | Henry et al. | |
| 2008/0144881 | A1 | 6/2008 | Fortune et al. | |
| 2008/0313028 | A1 * | 12/2008 | Williams et al. | 705/14 |
| 2009/0006151 | A1 | 1/2009 | Zargjhami | |
| 2009/0171726 | A1 | 7/2009 | Johnson | |
| 2010/0010873 | A1 | 1/2010 | Moreau | |
| 2010/0241501 | A1 | 9/2010 | Marshall | |
| 2011/0052075 | A1 | 3/2011 | Comay et al. | |
| 2012/0072280 | A1 * | 3/2012 | Lin | 705/14.45 |

FOREIGN PATENT DOCUMENTS

| | | |
|---|---|---|
| WO | 02057979 A1 | 7/2002 |
| WO | 2009015222 A1 | 1/2009 |
| WO | 2010082159 A1 | 7/2010 |

OTHER PUBLICATIONS

Data Id Online, "What's OCR?", 2003, found on line at www.dataid.com/aboutocr.htm.*

* cited by examiner

*Primary Examiner* — John G Weiss
*Assistant Examiner* — Scott C Anderson
(74) *Attorney, Agent, or Firm* — Pillsbury Winthrop Shaw Pittman LLP (57) ABSTRACT

Disclosed is a card-less reward system providing buyers with promotional offers and engendering buyers to be rewarded by submitting receipts obtained from sellers. A method for rewarding the buyers comprises providing to a buyer a list of promotional offers for a product or service of at least one seller, allowing the buyer to accept electronically at least one promotional offer, and allowing the buyer to submit a digital image of at least one receipt obtained from the seller, which offered the accepted promotional offer. The method further comprises processing received image to retrieve purchase data, and rewarding the buyer in response to the retrieved purchase data.

25 Claims, 7 Drawing Sheets

METHOD AND APPARATUS FOR PROVIDING CARD-LESS REWARD PROGRAM

CROSS-REFERENCE TO RELATED APPLICATIONS

This Application claims priority to U.S. Provisional Patent Application Ser. No. 61/439,956, filed Feb. 7, 2011, which is incorporated by reference herein in its entirety.

STATEMENT REGARDING FEDERALLY SPONSORED RESEARCH AND DEVELOPMENT

Not Applicable.

FIELD OF THE INVENTION

The present invention relates generally to online incentive reward programs, and more particularly, to card-less reward programs providing customers with promotional offers and engendering customers to be rewarded by submitting receipts obtained from merchants.

DISCUSSION OF RELATED ART

Loyalty programs are widely spread to encourage and engender customers to make more purchasing decisions. Generally, loyalty programs provide customers with loyalty cards or coupons.

Loyalty cards (also known as reward cards, points cards, club cards or like) are plastic or paper cards, visually similar to a credit card identifying the card holder as a member in a loyalty program. In general, participation in a loyalty program drives customers to collect points when they purchase a product or service. When a sufficient number of points are accumulated, the customer can redeem them towards an award, discount, a free product or service, etc.

At the moment, a great number of reward programs providing customers with loyalty cards are offered. Such loyalty programs are of great interest to merchants in attracting and keeping customers, while customers are encouraged to do more purchases at merchants which issue corresponding loyalty cards.

However, the ubiquity of loyalty programs has led to an ebbing of their impact. Many customers possess so many loyalty cards and participate in so many loyalty programs that the influence of such programs has come down.

Customers often do not have a specific loyalty card on hand at a point of sale (in a store, restaurant, hotel, rental car office, airport, etc.), or do not remember which cards they have and which of them can be applied. Moreover, many stores do not apply discounts or reward customers when customers do not have their loyalty cards on hand. As a result, many customers do not actively participate in loyalty programs even after they have been enrolled.

In addition to loyalty cards, coupons are also an effective way to attract new customers or encourage current customers. Coupons are paper tickets or electronic documents that can be exchanged for a financial discount or rebate when purchasing a product or service. Traditionally, coupons are issued by manufacturers or by retailers, to be used in retail stores or restaurants as a part of sales promotions. They are often widely distributed through mail, magazines, newspapers, the Internet, and mobile devices such as mobile phones. In general, coupons can be redeemed at the time of purchase by a customer showing a coupon to a cashier at the Point of Sale (POS). Customers are then given a financial discount, rebate, free product or service.

Delivery of printed paper coupons is traditionally expensive for the marketer. In addition to the cost of printing and delivering, the marketer also incurs the costs of training personnel to accept the coupons at a POS. Moreover, there can be fraud in redeeming paper coupons.

In recent years, paperless coupons are widely used by marketers or retailers. Such paperless coupons can be delivered via the Internet, e-mails, mobile messages like SMS, media messages, or like. The coupons can be redeemed at merchants without the need of printing those coupons, as they can be shown at the POS directly via the mobile phone, smart phone, PDA, etc.

However, although marketers or retailers avoid the costs of printing and delivery of the paperless offers, they still face significant costs associated with fraud, training of staff at stores to accept and process coupons, and installing any software at the POS.

In addition, the customers often forget to redeem (paper or paperless) coupons because it can be difficult to find needed coupons or even remember that they have coupons that can be applied to their purchases. Further, customers may forget to take their coupons with them to a store or may not have coupons with them for other reasons. Moreover, in many instances, customers would like to enjoy anonymity, and not be embarrassed with bringing coupons, for example, at a restaurant or a store.

Accordingly, a need exists for providing a technique for rewarding customers for a purchase without a necessity for customers to obtain, collect, bring to the POS any promotional coupons or loyalty cards.

SUMMARY OF INVENTION

The following presents a simplified summary of one or more embodiments to provide a basic understanding to the reader of such embodiments. This summary is not an extensive overview of all contemplated embodiments, and it does not identify key/critical elements of the invention or delineate the scope of the invention. Its sole purpose is to present some concepts disclosed herein in a simplified form as a prelude to the more detailed description that is presented later.

In accordance with one or more embodiments and corresponding disclosure thereof, various aspects of card-less reward techniques are described herein. By uniquely delivering to customers promotional offers, allowing them to electronically accept these offers, and collecting information of made purchases by allowing the customers to submit images of obtained receipts, the described infrastructure allows customers to be rewarded according to the accepted promotional offers without a necessity to redeem coupons or loyalty cards at a POS, and allows merchants to encourage customers or promote products or services without a necessity to train staff to accept and process coupons or loyalty cards, or to install specific software for processing such coupons or loyalty cards.

According to one aspect, a computer implemented method for accepting promotional offers is provided. The method can comprise the steps of: displaying in a networked device of a buyer a list of promotional offers for a product or service of at least one seller; allowing the buyer to accept electronically at least one promotional offer; allowing the buyer to submit a digital image of at least one receipt obtained from the seller which offered the accepted promotional offer; checking compliance of purchase data on the submitted receipt with the conditions of the promotional offer; and electronically computing a reward to be given to the buyer according to the conditions of the promotional offer.

According to another aspect, an apparatus for participation in a promotional program is provided. The apparatus can comprise at least one module configured to display a list of promotional offers of at least one seller, a module to accept at least one promotional offer by a buyer, a module to submit a digital image of at least one receipt obtained from the seller which offered the accepted promotional offer, a module for checking compliance of purchase data on the receipt with the conditions of the promotional offer; and a module for computing a reward to be given to the buyer according to the conditions of the promotional offer.

Yet another aspect relates to a computer-readable medium embodying a set of instructions for providing promotional rewards executable by one or more processors on a computing device. The set of instructions are executable to display a list of promotional offers of at least one seller; executable to accept at least one promotional offer; executable to submit a digital image of at least one receipt obtained from the seller which offered the accepted promotional offer; executable to check compliance of purchase data on the receipt with the conditions of the promotional offer; and executable to compute a reward to be given to the buyer according to the conditions of the promotional offer.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings provided to illustrate and not to limit the disclosed aspects, wherein like numerals denote like elements, and in which.

DETAILED DESCRIPTION OF THE PREFERRED EMBODIMENTS

The problem of providing promotional rewards to a buyer is solved by displaying in a networked device of a buyer a list of promotional offers for a product or service of at least one seller; allowing the buyer to accept electronically at least one promotional offer; allowing the buyer to submit a digital image of at least one receipt obtained from the seller which offered the accepted promotional offer; checking compliance of purchase data on the submitted receipt with the conditions of the promotional offer; and electronically computing a reward to be given to the buyer according to the conditions of the promotional offer.

As used herein, the term "offer" or "promotional offer" is used to refer to a financial discount, rebate, reward, coupon or other promotional feature provided to a customer by a merchant. The term "customer" as used herein is intended to refer to a buyer or a consumer and defines any individual that does purchases. The term "merchant" is used herein to refer to a seller, retailer, distributor, trader, etc. It should be understood that merchants sell commodities (products or services) to customers at stores, shops, malls, restaurants, bistros, hotels, rental offices, transport companies, etc.

Figure 1:
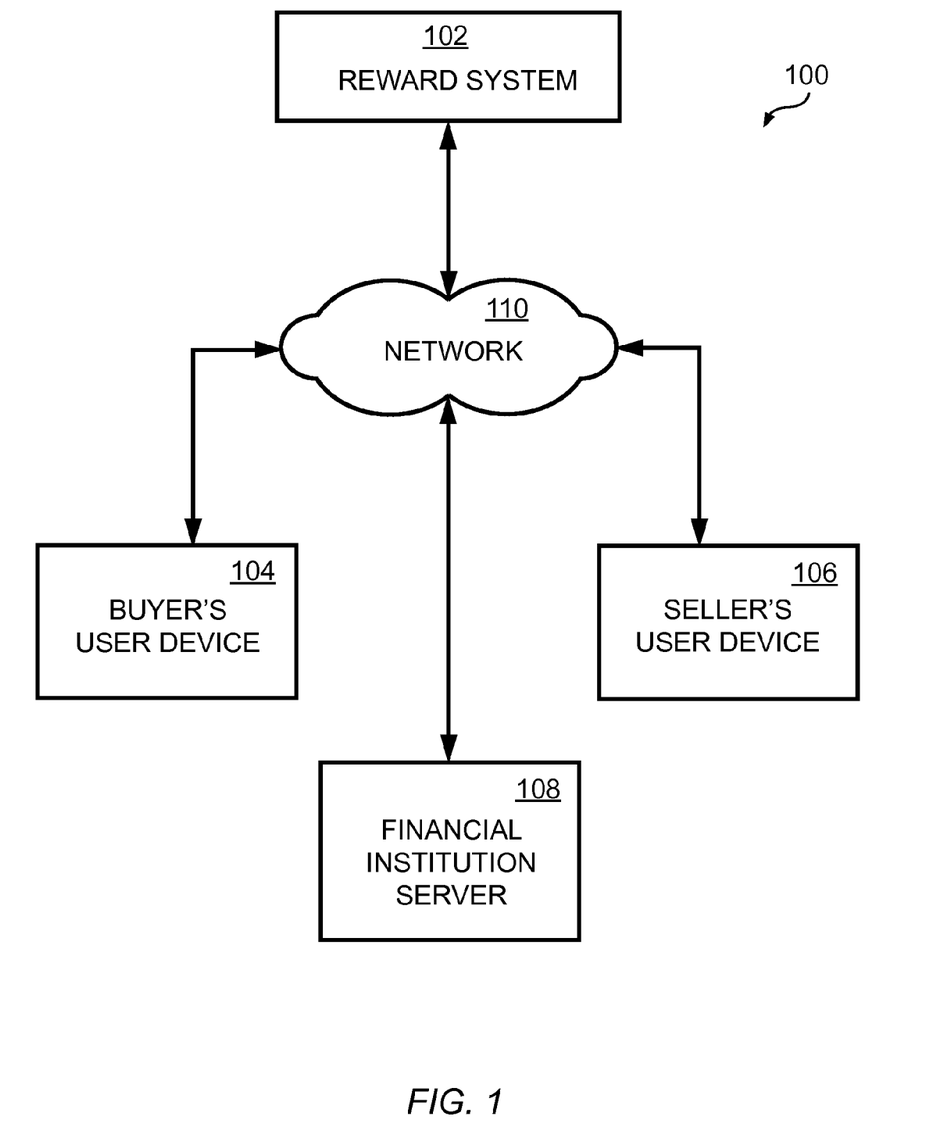
FIG. 1 illustrates a block diagram of a card-less reward system providing a possibility to participate in a reward program by customers and merchants in accordance with various embodiments of the present invention.

Referring now to the drawings, FIG. 1 illustrates a cardless reward system providing a possibility to participate in a reward program by buyers and sellers in accordance with various embodiments presented herein. The system 100 comprises a reward system 102, a buyer's user device 104, a seller's user device 106, a financial institution server 108 and a network 110. The buyer's user device 104, the seller's user device 106, the financial institution server 108, and the reward system 102 are all connected via the network 110 such as the Internet.

As used herein, the term "user device" (such as the buyer's user device 104 and the seller's user device 106) refers to a mobile device, a terminal, user equipment, a portable communication device, a computer, a portable computing device, a personal digital assistant (PDA), or some other electronic device with ability to receive and transmit data via cable or wireless network (e.g. with ability to browse the Internet.).

As used herein, the term "mobile device" refers to handheld devices carried by customers. For example, a mobile device may be a handheld cellular phone, a mobile phone, a smart phone, a cordless telephone, a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device, a global positioning system device, or any other suitable device that is configured to communicate via a wireless medium.

In some embodiments, mobile devices are provided with the ability to browse and interact with websites in the Internet, allowing buyers to select offers and interact with certain aspects of the reward system according to the present invention. In some embodiments, the mobile devices are provided with an application program which allows communication with the reward system according to the present invention.

In some embodiments, mobile devices are provided with a digital camera and corresponding software allowing a user to make digital pictures. In addition, according to some embodiments, mobile devices may comprise a navigation system such as a receiver of the Global Positioning System (GPS) and corresponding software allowing a user of the mobile device to determine current location of the mobile device, display maps, navigating, finding a certain address, getting directions and routes, etc.

A preferred embodiment of the present invention is implemented in a client-server environment as shown herein. The Internet is one example of a client-server environment. However, any other appropriate type of client-server environment, such as an intranet, a wireless network, a telephone network, etc. may also be used. The present invention is not limited to the client-server model and could be implemented using any other appropriate model.

The financial institution server 108 may include a banking server, credit (debit or prepaid) card server, virtual account server, on-line banking server, etc. In this disclosure, the term "financial institution" means any organization in the business of transacting money and providing financial services. Financial institutions such as commercial banks provide services like establishing banking accounts (checking or savings accounts), cash withdrawals and deposits, issuing credit cards, debit cards, etc. The financial institution server 108 may be associated with buyers' payment cards (such as credit, debit, or prepaid cards) and it can be used by cardholders to make payments and/or receive payments.

Figure 2:
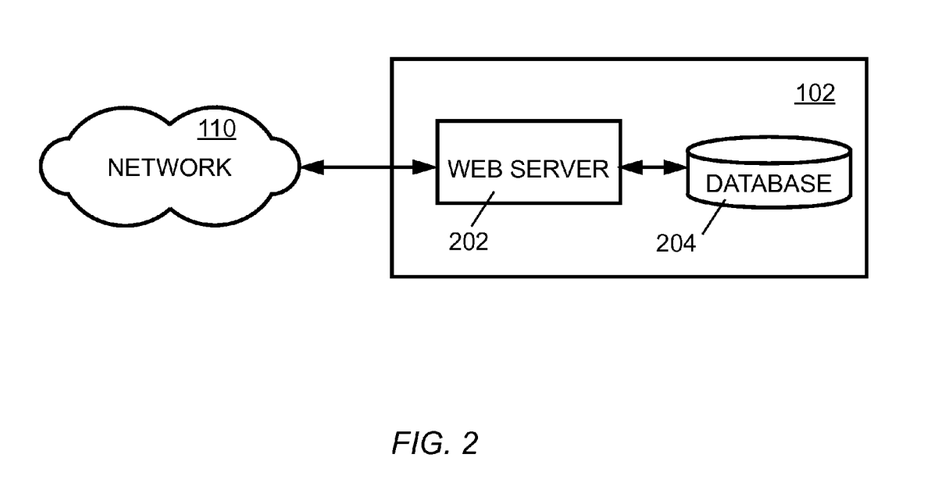
FIG. 2 illustrates a block diagram of a reward system presented at FIG. 1 according to exemplary embodiments of the invention.

FIG. 2 is a diagram of a reward system 102. The reward system 102 includes a web server 202 and a database 204. The web server 202 provides the connection to the network 110. Pursuant to the exemplary embodiment, the web server 202 is connected to the database 204 for reading and writing data therein. The database 204 stores rewards-related data such as promotional offers, buyers' data, sellers' data, transaction data, rewarding methods, etc. Information related to rewarding methods may include data identifying the types of transactions that qualify for a reward and other eligibility criteria such as reward program eligibility dates, purchase items, total price, etc.

The web server 202 can be implemented as a hardware (computer or server) having software (a computer application) installed therein that helps deliver content to buyers. The web server 202 hosts a website which can be accessed by buyers and sellers to participate in and/or manage reward programs according to exemplary embodiments of the present invention. The software of the web server 202 implements the steps necessary to deliver, organize (sort) and manage promotional offers of sellers, and to participate in reward programs by buyers according to the exemplary embodiments of the present invention. The web server 202 is configured to communicate with the buyer's user device 104, the seller's user device 106 and the financial institution server 108 via the network 108.

A seller, with the help of the seller's user device 106, may upload information regarding promotional offers to the database 204 via the web server 202. The seller may also establish new promotional offers, manage, and cancel existing promotional offers, determine rewarding methods and other criteria. The seller may also register and establish a personal account (profile) at the database 204, which may include such information as name of business, type of business, address, contact information, available promotional offers, ratings, rankings, commentary of users, etc.

A buyer may also establish a personal account (profile) at the database 204, which may include such information as name, information of accepted promotional offers, information about redeemed offers, earned points, etc.

The buyer, with the help of the buyer's user device 104, may access the database 204 via the web server 202. Such access may be implemented via a website hosted at the web server 202 or via an application installed on the buyer device 104. The buyer may review available promotional offers provided by sellers, review sellers' information (such as address, contacts, web links, ranking, commentary of users, etc.). Listing of available promotional offers provided by sellers may be organized (sorted) in different ways. According to the exemplary embodiment, listings of available promotional offers may be delivered and sorted to the buyer's user device 104 according to a set of predetermined parameters such as type of business, address, ranking, etc. In one of the preferred embodiments, listings of available promotional offers may be sorted and presented to the buyer depending on the distance between the buyer and the seller. Those who are skilled in the art would understand that other organization or sorting ways can also be implemented.

According to the exemplary embodiment, distance between the current location of the buyer's user device 104 and the seller's address can be calculated based on location information determined through the GPS receiver, or data received from the base stations of the cellular network, or IP address obtained from the access point providing cable or wireless connection to the user device 104, or a combination thereof. Those who are skilled in the art can readily understand that any other appropriate way of determining current location of the buyer's user device 104 can be used.

Figure 3:
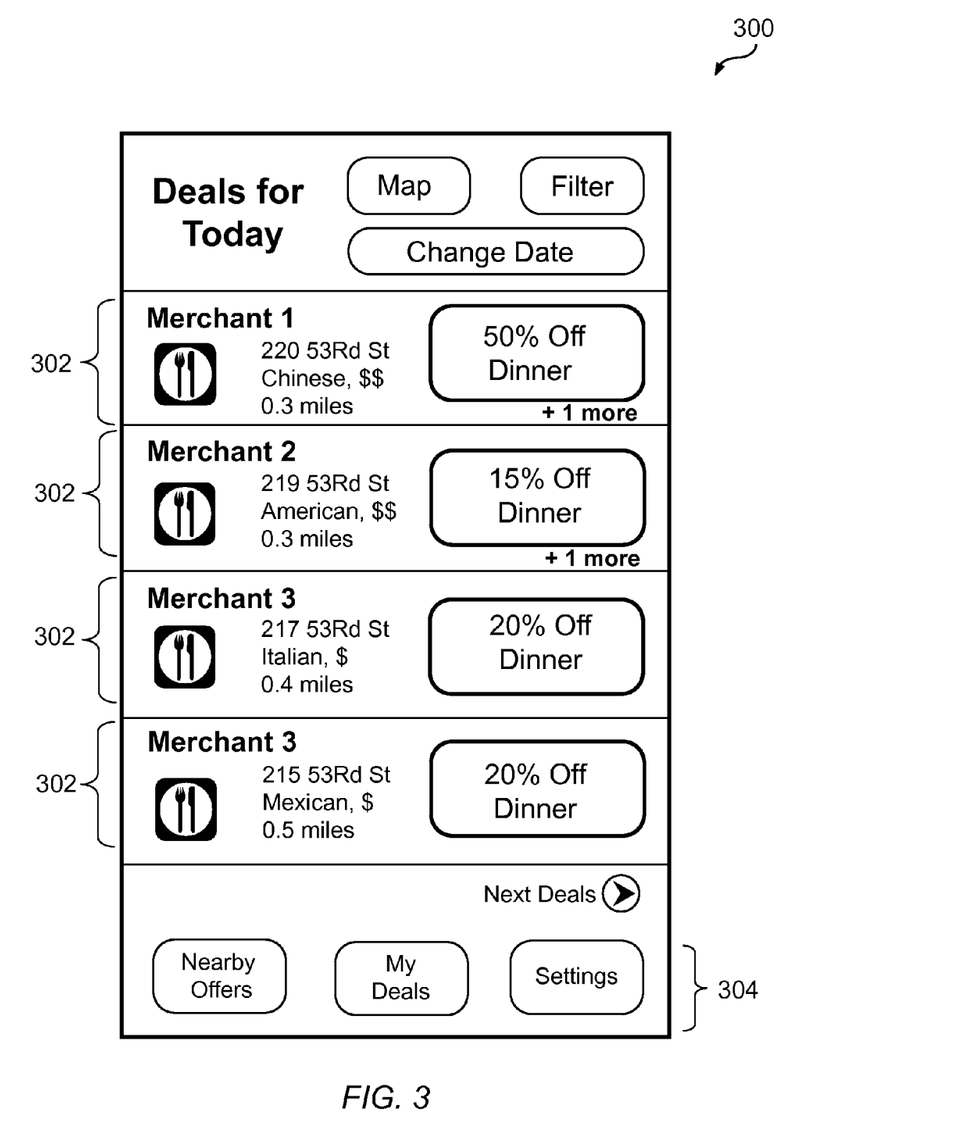
FIG. 3 illustrates a screen shot of a graphical user interface for displaying available promotional offers according to exemplary embodiments of the invention.

FIG. 3 is an exemplary screen shot of a graphical user interface 300 presenting listing of available promotional offers according to an exemplary embodiment of the present invention. In the example shown here, this is a first view of a graphical user interface 300 when the buyer opens the website hosted at the web server 202 or when the application installed in the buyer's user device 104 is activated.

The graphical user interface 300 shows at least one promotional offer 302, and preferably a list of promotional offers 302. Each promotional offer 302 includes one or more of the following: name of business, picture (such as logo or product view), address, type of business, price range, ranking, distance between current buyer's location and the seller's location, available promotional offers on specific date, etc. The graphical user interface 300 may also include clickable targets 304 to buyer's settings, previously selected promotional offers, other promotional offers, map, data changing, and any other features.

According to the exemplary embodiment, the graphical user interface 300 shows a list of promotional offers 302 available on current date and sorted by distance between the buyer and corresponding seller (displaying the nearest seller first). In other embodiments, the graphical user interface 300 shows first featured promotional offers 302.

Each promotional offer 302 can be shown as a clickable button. By clicking on a promotional offer 302, the buyer is guided to the detailed view of the promotional offer, which is shown on a screen shot depicted at FIG. 4. In the example shown here, this is a view of a graphical user interface 400 when the buyer is provided with records of the description 402 of the seller having one or more promotional offers 404, which are also displayed to the buyer. The seller's description 402 may include such information as name of business, picture (logo or product view), address(es), type of business (for example, a restaurant, a book store, a car rental office), price range (may be defined by "$", "$$", "$$$" signs, as an example), contact information (links or clickable buttons for a website, phone number or alike), ranking, reviews, profile, menu or price list, distance to the buyer's location, etc. The graphical user interface 400 also displays one or more detailed description of promotional offers 404. Each element depicting a promotional offer 404 shows detailed description of the offer including, but not limited to: a financial discount, rebate amount, reward amount, requirements or conditions for the reward, date or time limits when the offer is available, etc. Each promotional offer 404 also includes means for accepting the offer. As shown here, it can be implemented as "Claim It" button 406. However any other clickable targets can be implemented. When a promotional offer 404 is accepted by the buyer, a corresponding record is made in the database 204 denoting that the specific buyer has accepted a certain promotional offer. Such promotional offer obtains the "Activated" status.

Figure 4:
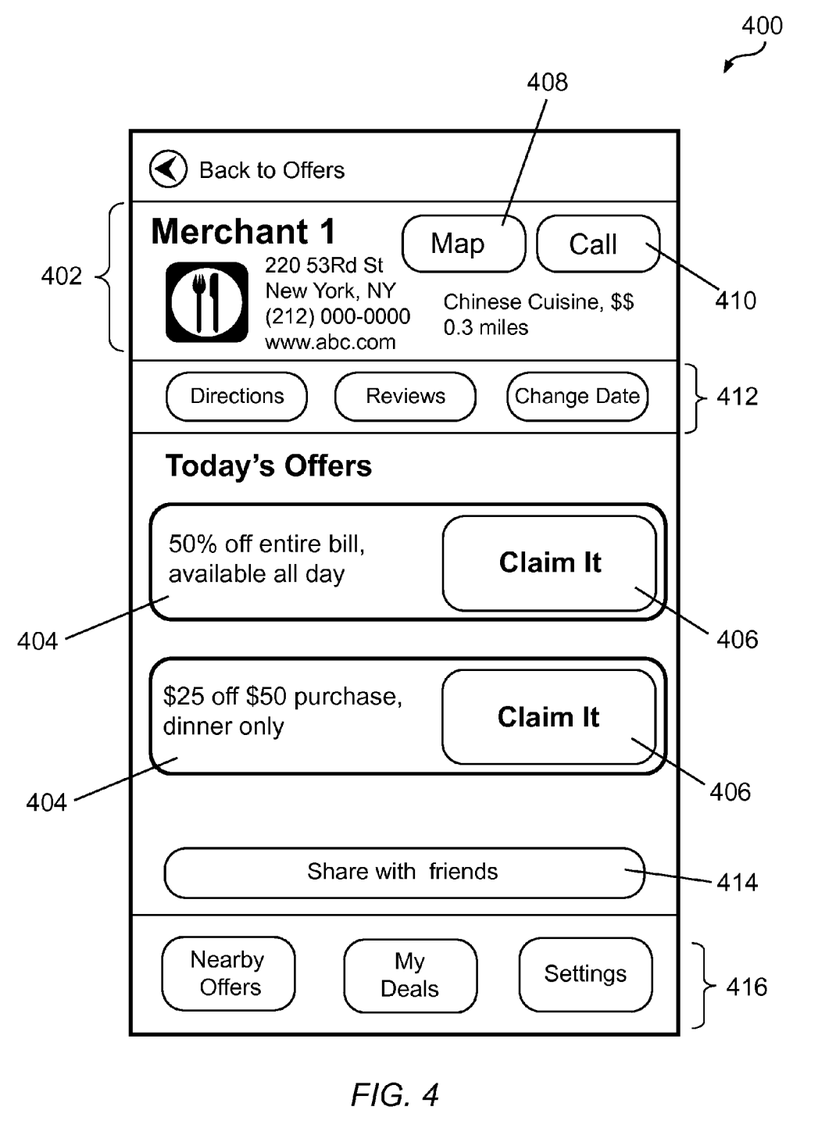
FIG. 4 illustrates a screen shot of a graphical user interface for detailed view of a promotional offer according to exemplary embodiments of the invention.

According to the exemplary embodiment, the graphical user interface 400 may also include means 408 to show a map indicating where the seller is located and means 410 for establishing a call to the seller. These means 408, 410 can be implemented as "Map" and "Call" buttons, accordingly, or any other possible clickable targets guiding the buyer to a corresponding website. For example, means 408 may take the buyer to a website with a map or activate a map application installed on the buyer's user device 104. On the map may be highlighted or any other way indicated the location of the seller, when it is selected by the buyer. Means 410 for establishing a call may drive the buyer to activate the user device feature or application for establishing a call.

The graphical user interface 400 may also include one or more items 412 to show directions on how to reach the seller from the current location of the buyer (in other words, a route from the buyer's location), to show reviews of other buyers, rankings, etc. Items 412 can again be implemented as clickable targets to a website or an application feature.

The graphical user interface 400 may also include items to assist the buyer to share the information about the promotional offer 404 with friends via e-mail, social networks, blogs, etc. For example, clickable targets 414 are provided to allow the buyer to open a corresponding website at a browser to share the information about the promotional offer 404. The graphical user interface 400 may also include items 416 to allow the buyer to change settings for viewing the promotional offers, review what promotional offers are already accepted ("Activated Offers"), see what promotional offers exist in the neighborhood of the seller.

Figure 5:
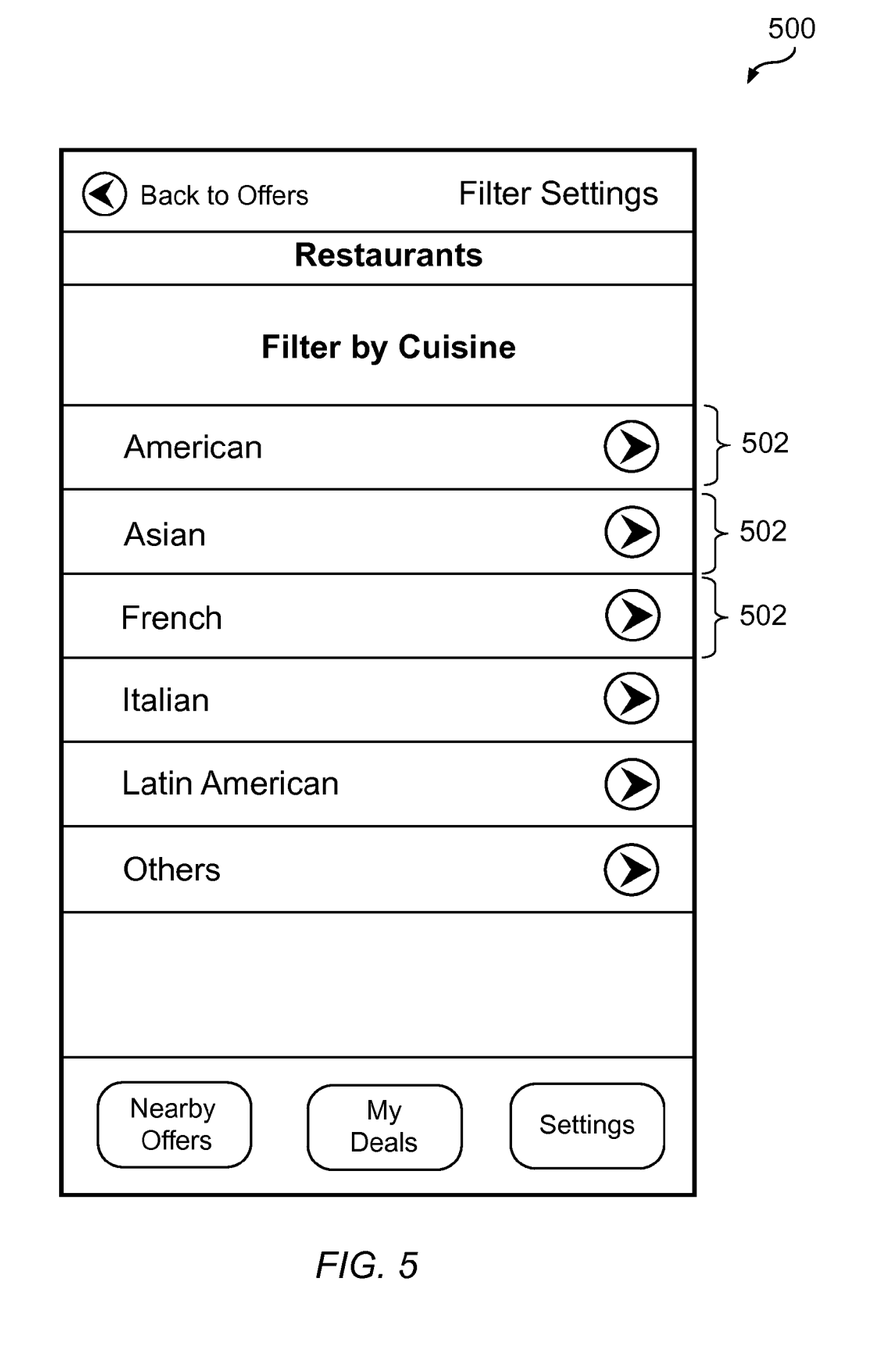
FIG. 5 illustrates a screen shot of a graphical user interface for setting filter settings according to exemplary embodiments of the invention.

FIG. 5 illustrates a screen shot from a graphical user interface 500 for setting filter settings by the buyer. Shown in this graphical display are settings to organize and/or sort available promotional offers. According to the exemplary embodiment, the promotional offers can be organized and sorted by a type of business, location, rank, ratings, price range, discount level, or like. In the shown example, the buyer is provided with ability to select a restaurant cuisine. The graphical user interface 500 may include one or more means 502 for selecting a desired way of sorting promotional offers, which can be implemented as a clickable buttons or targets. In the example shown on FIG. 5, the buyer may select one of the restaurant cuisines such as "American", "Asian", "French", "Italian", "Latin American", etc. When the buyer selects one of the proposed ways for sorting promotional offers, the buyer is then driven to the graphical user interface 300 listing promotional offers 302 in the order selected by the buyer. For example, only restaurants with "Italian" cuisine may be shown at the display for further selection by the buyer.

Figure 6:
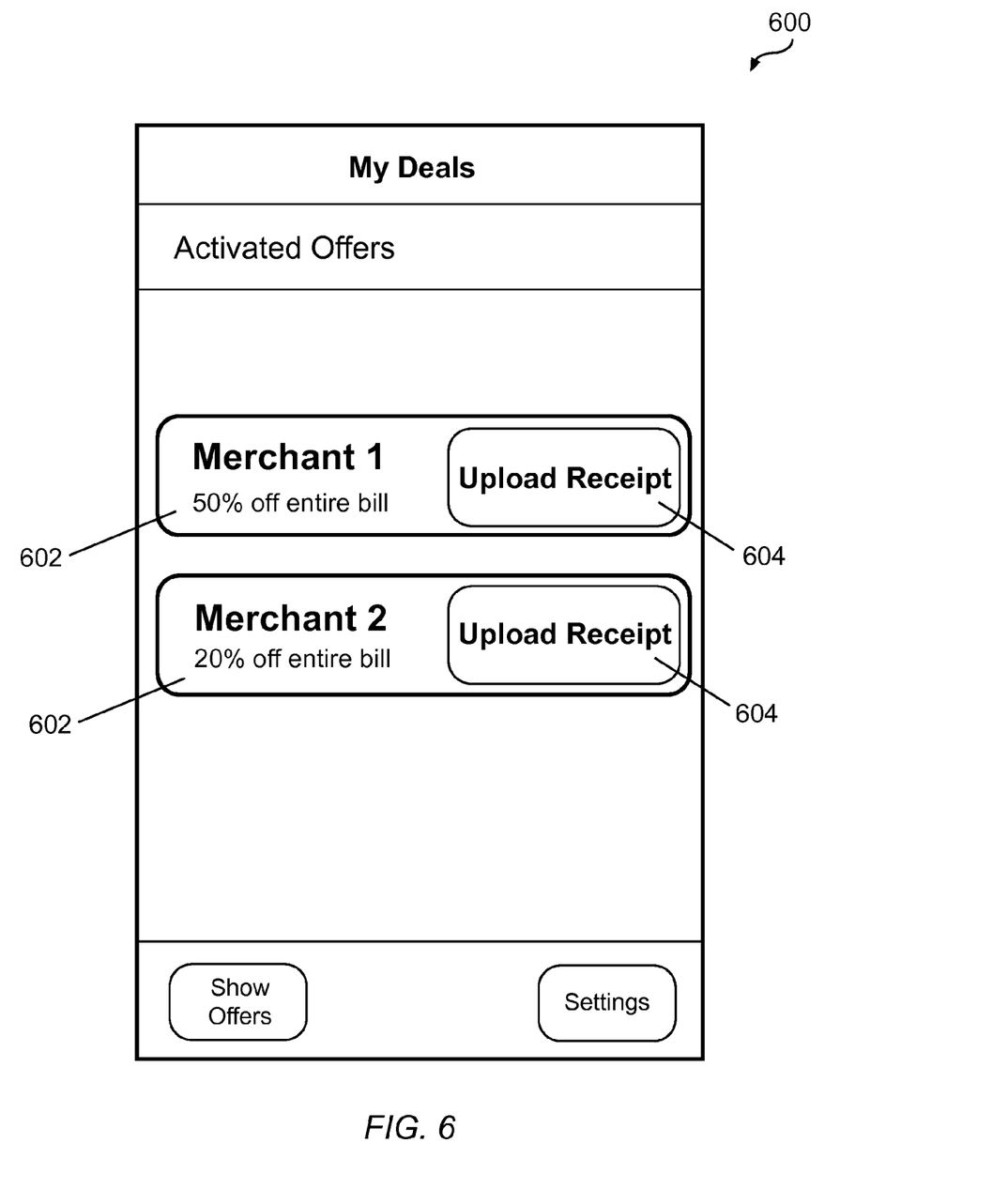
FIG. 6 illustrates a screen shot of a graphical user interface for displaying records of the database listing accepted promotional offers according to exemplary embodiments of the invention.

FIG. 6 illustrates a screen shot from a graphical user interface 600 for displaying records of the database 204 what promotional offers have been accepted by the buyer (at the graphical user interface depicted on FIG. 4). In the exemplary embodiment, the graphical user interface 600 displays to the buyer one or more activated promotional offers 602. Each item 602 comprises a brief description of the promotional offer as well as a means 604 for uploading a receipt obtained by the buyer by doing a purchase at the seller according to the requirements related to the activated promotional offer. In one embodiment, the means 604 for uploading a receipt maybe implemented as a clickable button. By clicking on this button, means 604 activates a camera application of the buyer's user device 104 (if the user device has a camera) to take a picture of a receipt obtained by the buyer. Thereafter, the picture is automatically uploaded by the user device application to the web server 202 for further processing. In another embodiment, when the buyer's user device 104 does not have a camera, means 604 may activate an e-mail application for sending a picture of the receipt or a pop-up window for uploading a picture stored in a memory of the buyer's user device. For those who are skilled in the art, it can be readily understood that any other appropriate way for sending a digital picture of receipt to the web server 202 can be implemented.

When the receipt's picture is received by the web server 202, the buyer's user device 104 is notified that the receipt's picture is received by the web server 202. It can be done by sending an acknowledgment message or any other appropriate way. Then, the receipt's picture is processed by the web server 202 to reveal details of the purchase. Processing can be implemented automatically by activating an optical recognition application. According to the exemplary embodiment, the optical recognition application installed at the web server 202 may recognize characters presented on the receipt picture and reveal corresponding details of the receipt such as, but not limited to: name of the seller, the receipt's date and time, amount spent by the buyer, a list of purchased products or services, etc. As soon as the details of the receipt are revealed, they can be stored in the database 204 and further processed by the web server 202. In the exemplary embodiment, the web server 202 verifies whether the buyer fulfilled any conditions attached to the activated promotional offer. For example, it can be verified whether the purchase is made at the seller, which promotional offer was previously accepted (activated) by the buyer, whether the purchase is made on a specific date or time, whether the amount spent is above a minimum amount, etc. Results of the verification may be sent to the buyer's user device 104. According to the exemplary embodiment, if all promotional offer conditions were fulfilled by the buyer, as it can be followed from the results of the verification, the buyer can be awarded with points or rebate or any other reward according to the details of activated promotional offer. For example, the buyer can be provided with a cash back rebate. In this case, the web server 202 instructs the financial institution server 108 to make a deposit to the banking account of the buyer at any bank which issued a payment card for the buyer, or to the virtual banking account associated with any appropriate financial institution (for example, PayPal®), or any other payment systems. According to another embodiment, the web server 202 may instruct the financial institution server 108 to issue a check (eCheck) for the buyer according to the activated promotional offer. In still another embodiment, the web server 202 may assign to the buyer virtual points (or credits) that can be used for further purchases at the registered sellers (or the points can be converted into cash). For those who are skilled in the art, it can be readily understood that any appropriate way for rewarding the buyer can be implemented. In case of rewarding, the buyer may be notified by a message or e-mail, through updating the buyer's profile stored in the database 204 or any other appropriate way. In some embodiments, the seller can also be notified by the web server 202 that certain promotional offers have been activated, information about submitted receipts, reward information, etc. The above information can also be viewed by the seller through the website at the personal profile.

Figure 7:
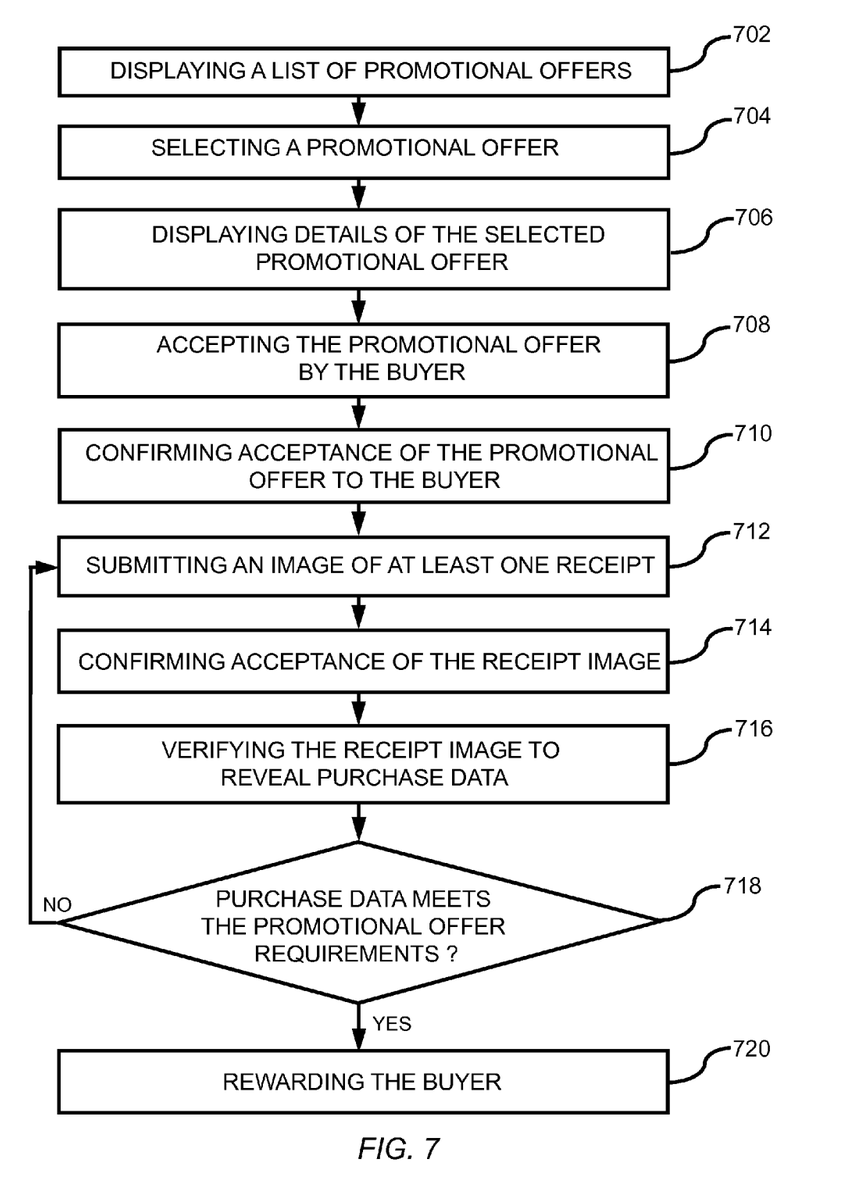
FIG. 7 illustrates a process flow chart for displaying, activating and redeeming of promotional offers according to exemplary embodiments of the invention.

FIG. 7 illustrates a process flow chart for displaying, activating and redeeming promotional offers by buyers. At block 702, a buyer is provided with a list of promotional offers for displaying at the buyer's user device 104. In the preferred embodiment, the list of promotional offers can be sorted by distance from the buyer's user device 104 to a corresponding seller location, starting with the closest seller. In this case, location data of the user device 104 can be used by the web server 202 or the application installed at the buyer's user device 104 to calculate said distance. In other embodiments, the list of promotional offers can be sorted by rating, price range, discount level, type of business, or any other preferences of the buyer. In some embodiments, the list of promotional offers can be sorted by parameters set in the buyer's profile. In addition, the buyer can conduct a search through the database 204 to find desired promotional offer satisfying the buyer's needs.

In accordance with embodiments described herein, at block 704 the buyer is provided with ability to select one promotional offer from the list of promotional offers provided to the buyer at block 702. In response to the selecting of promotional offer, at block 706, the buyer is provided with detailed description of the selected promotional offer for displaying at the buyer's user device 104.

Further, at block 708, the buyer is provided with ability to accept the promotional offer provided for displaying at block 706. In this case, accepted promotional offer becomes "Activated". According to the invention, at block 708 a corresponding message may be sent from the buyer's user device 104 to the web server 202 to store information about accepting of the promotional offer in the database 204.

At block 710, the buyer can be provided with confirmation on successful acceptance of the promotional offer. In the exemplary embodiment, the web server 202 sends a confirmation message to the buyer via e-mail, or drives the buyer to the confirmation web page, pop-up window or any other appropriate way.

At block 712, the buyer is provided with ability to submit (upload) a digital image of at least one receipt obtained from the seller related to the activated promotional offer. Submission of the receipt's image may be performed, for example, by initiating a camera application installed in the buyer's user device to take a picture by the camera. In other embodiments, the buyer may submit a picture (e.g. digital photo) of the receipt via e-mail or software installed in the web server 202, or any other appropriate way. In response to receiving the receipt's image, the web server 202 stores it in the database 204. At block 714, the web server 202 may send a confirmation message on receipt of the receipt's picture.

At block 716, the web server verifies the receipt. According to the exemplary embodiment, the verification process may include optical recognition of the receipt's image, and revealing purchase data. The purchase data may include the following, but not limiting to: name of the seller, the receipt's date and time, amount spent by the buyer, a list of purchased products or services, total price, etc.

Still referring to FIG. 7, at block 718, the web server 202 processes purchase data retrieved from the receipt to determine whether purchase data meets the requirements of the activated promotional offer. For example, the web server 202 may check whether the purchase is made in the specific date or time and/or at specific seller, whether the amount spent is above a minimum amount, etc. If the requirements are not fulfilled, the buyer is notified about that, and may be asked to submit another receipt. In the exemplary embodiment, the buyer may then be directed to block 712.

If the requirements are fulfilled, at block 720, the buyer is rewarded. Specifically, the web server 202 calculates or determines what reward the buyer can be granted based on the requirements of the accepted promotional offer. In the exemplary embodiment, the buyer may be awarded with points or rebate or any other reward according to the details of the activated promotional offer. For example, the buyer can be provided with a cash back rebate or virtual money or credits. In this case, the web server 202 instructs the financial institution server 108 to make a deposit to the banking account of the buyer at any bank which issued a payment card for the buyer, or to any other payment system. The buyer may also be notified by a message, e-mail or any other appropriate way that the buyer was rewarded in response to the submitting the receipt.

According to the exemplary embodiments of the present invention, in response to the reward, the database 204 may also be updated with corresponding information. The buyer then may review at the database 204 what promotional offers were redeemed, total amount of awarded points or rebates, total savings, current month savings, etc.

Furthermore, according to some embodiments, the buyer may also share information about promotional offers, rewards, and provide commentary of the promotional offers or sellers which provide promotional offers, performance ratings, etc. For this purposes, the web server may possess specific means for sharing information such as blogs, social networking features, message board, online bulletin, polls, etc. In addition, mentioned means for sharing information may be implemented as clickable targets to remote websites for blogging, micro-blogging, social networking, e-mailing, etc.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The previous description of the disclosed aspects is provided to enable any person skilled in the art to make or use the present disclosure. While a particular form of the invention has been illustrated and described, it will be apparent that various modifications can be made without departing from the spirit and scope of the invention. Accordingly, it is not intended that the invention be limited, except as by the appended claims. Various modifications to these aspects will be readily apparent to those skilled in the art, and the generic principles defined herein may be applied to other aspects without departing from the scope of the disclosure. The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other articles, not necessarily the article described above. The elements and acts of the various embodiments described above can be combined to provide further embodiments.

The above description provides specific details for a thorough understanding of the invention. One skilled in the art will understand that the invention may be practiced without such details. In other instances, well-known structures and functions have not been shown or described in detail to avoid unnecessarily obscuring the description of the embodiments.

The word "exemplary" is used in this description to mean "serving as an example, instance, or illustration". Any embodiment described herein as "exemplary" is not necessarily to be construed as preferred or advantageous over other embodiments. Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Particular terminology used when describing certain features or aspects of the invention should not be taken to imply that the terminology is being redefined herein to be restricted to any specific characteristics, features, or aspects of the invention with which that terminology is associated. In general, the terms used in the appended claims should not be construed to limit the invention to the specific embodiments disclosed in the specification, unless the Detailed Description section explicitly defines such terms. Accordingly, the actual scope of the invention encompasses not only the disclosed embodiments, but also all equivalent ways of practicing or implementing the invention.

Those of skill in the art would understand that any of the various illustrative logical blocks, modules, processors, means, and algorithm steps described in connection with the aspects disclosed here may be implemented as electronic hardware (for example, a digital implementation, an analog implementation, or a combination of said two, which may be designed using source coding or some other technique), various forms of program or design code incorporating instructions (which may be referred to herein, for convenience, as "software"), firmware, or combinations of the above. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Those who are skilled in the art may implement the described functionality in varying ways for each particular application, but such implementation decisions should not be interpreted as causing a departure from the scope of the present disclosure.

If implemented in software, the functions may be stored on or transmitted over as one or more instructions or code on a computer-readable medium. A computer-readable medium includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web server, website, server, or other remote source using a cored or cordless network, then the cored or cordless network is included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium. It should be appreciated that a computer-readable medium may be implemented in any suitable computer-program product.

For a hardware implementation, embodiments can be implemented with processors, controllers, micro-controllers, microprocessors, electronic devices, other electronic units designed to perform the functions described herein, or a combination thereof. Memory can be implemented within the processor or external to the processor. As used herein the term "memory" refers to any type of long term, short term, volatile, nonvolatile, or other storage devices and is not to be limited to any particular type of memory or number of memories, or type of media upon which memory is stored. For a firmware and/or software implementation, embodiments can be implemented with modules such as procedures, functions, and so on, that perform the functions described herein. Any machine readable medium tangibly embodying instructions can be used in implementing the embodiments described herein.

All listed patents, applications, and other references, including any that may be listed in the accompanying filing papers, are incorporated herein by reference. Aspects of the invention can be modified, if necessary, to employ the systems, functions, and concepts of the various references described above to provide yet further embodiments of the invention.

While certain aspects of the invention are presented below in certain claim forms, the inventor reserves the right to add additional claims after filing the application to pursue such additional claim forms for other aspects of the invention.

What is claimed is:

1. A computer implemented method for providing promotional rewards, the method being implemented by a computing device having a physical processor programmed with one or more computer program instructions that, when executed, program the physical processor to perform the method, the method comprising:
    providing, by the processor programmed with the one or more computer program instructions, a plurality of promotional offers, wherein at least a first promotional offer is associated with a condition that must be satisfied in order to receive a reward associated with the first promotional offer;
    receiving, by the processor, a selection of the first promotional offer from a user, wherein the selection indicates an acceptance of the first promotional offer;
    receiving, by the processor, a digital image of a receipt that is related to a purchase transaction with a seller that is associated with the first promotional offer, wherein the digital image is generated at a mobile device of the user;
    obtaining, by the processor, purchase information associated with the purchase transaction based on the digital image of the receipt;
    determining, by the processor, whether the condition of the first promotional offer has been satisfied based on the purchase information; and
    causing, by the processor, the reward to be communicated based on a determination that the condition has been satisfied.

2. The method of claim 1, wherein obtaining the purchase information comprises performing optical character recognition on the digital image of the receipt.

3. The method of claim 1, the method further comprising providing a message related to the reward to a networked device associated with the user that selected the first promotional offer.

4. The method of claim 1, wherein the reward comprises a monetary value, and wherein the method further comprises causing an amount of the monetary value to be credited to an account associated with the user that selected the first promotional offer.

5. The method of claim 1, the method further comprising:
obtaining and storing a user preference;
sorting the plurality of offers based on the user preference; and
causing the plurality of promotional offers to be displayed based on the sorting.

6. The method of claim 5, wherein the user preference comprises a type of a business that offers a given promotional offer, a distance range between the business and a given location, a price range, a reward level, or a rating of the business.

7. The method of claim 4, the method further comprising:
identifying, by the processor, a financial account that the user used to pay for the purchase transaction, wherein causing the amount of the monetary value to be credited to an account comprises causing the amount of the monetary value to be credited to the financial account.

8. The method of claim 1, wherein receiving the digital image of the receipt comprises receiving a digital picture of the receipt.

9. The method of claim 5, wherein sorting the plurality of offers based on the user preference comprises:
determining a first distance between a first business that offers the first promotional offer and a location associated with a user;
determining a second distance between a second business that offers a second promotional offer and the location associated with the user; and
sorting the first promotional offer and the second promotional offer based on the first distance and the second distance.

10. The method of claim 1, wherein the condition relates to an amount spent during a given purchase transaction, and wherein determining whether the condition of the first promotional offer has been satisfied comprises determining the amount spent based on the purchase information.

11. The method of claim 1, wherein the condition relates to a time and/or date of a given purchase transaction, and wherein determining whether the condition of the first promotional offer has been satisfied comprises determining the time and/or date of the purchase transaction based on the purchase information.

12. The method of claim 1, wherein the condition comprises a requirement to make a purchase from a given seller, and wherein determining whether the condition of the first promotional offer has been satisfied comprises identifying the seller associated with the purchase information to determine whether the requirement to make the purchase from the given seller has been satisfied.

13. The method of claim 1, wherein the condition comprises a requirement to purchase a particular item, and wherein determining whether the condition of the first promotional offer has been satisfied comprises identifying whether the particular item was purchased based on the purchase information.

14. The method of claim 1, the method further comprising:
notifying, by the processor, the seller associated with the first promotional offer that the first promotional offer was selected.

15. A system for providing promotional rewards, the system comprising:
a mobile device of a user;
a physical processor programmed with one or more computer program instructions to:
provide a plurality of promotional offers, wherein at least a first promotional offer is associated with a condition that must be satisfied in order to receive a reward associated with the first promotional offer;
receive a selection of the first promotional offer from the user, wherein the selection indicates an acceptance of the first promotional offer;
receive a digital image of a receipt that is related to a purchase transaction with a seller that is associated with the first promotional offer, wherein the digital image is generated at the mobile device of the user;
obtain purchase information associated with the purchase transaction based on the digital image of the receipt;
determine whether the condition of the first promotional offer has been satisfied based on the purchase information; and
cause the reward to be communicated based on a determination that the condition has been satisfied.

16. The system of claim 15, wherein the processor is programmed to obtain the purchase information based on optical character recognition performed on the digital image of the receipt.

17. The system of claim 15, wherein the processor is programmed to provide a message related to the reward to a networked device associated with the user that selected the first promotional offer.

18. The system of claim 15, wherein the reward comprises a monetary value, and wherein the processor is further programmed to cause an amount of the monetary value to be credited to an account associated with the user that selected the first promotional offer.

19. The system of claim 15, wherein the processor is further programmed to:
obtain and store a user preference;
sort the plurality of offers based on the user preference;
cause the plurality of offers to be displayed based on the sorted plurality of offers.

20. The system of claim 15, the system further comprising a database of promotional offers of a plurality of sellers.

21. A non-transitory computer-readable medium that stores one or more computer program instructions, which when executed by one or more physical processors causes the one or more physical processors to perform a method of providing promotional rewards, the method comprising:
providing a plurality of promotional offers, wherein at least a first promotional offer is associated with a condition that must be satisfied in order to receive a reward associated with the first promotional offer;
receiving a selection of the first promotional offer from a user, wherein the selection indicates an acceptance of the first promotional offer;
receiving a digital image of a receipt that is related to a purchase transaction with a seller that is associated with the first promotional offer, wherein the digital image is generated at a mobile device of the user;
obtaining purchase information associated with the purchase transaction based on the digital image of the receipt;

determining whether the condition of the first promotional offer has been satisfied based on the purchase information; and causing the reward to be communicated based on a determination that the condition has been satisfied.

22. The non-transitory computer-readable medium of claim 21, wherein obtaining the purchase information comprises performing optical character recognition on the digital image of the receipt.

23. The non-transitory computer-readable medium of claim 21, the method further comprising providing a message related to the reward to a networked device associated with the user that selected the first promotional offer.

24. The non-transitory computer-readable medium of claim 21, wherein the reward comprises a monetary value, and wherein the method further comprises causing an amount of the monetary value to be credited to an account associated with the user that selected the first promotional offer.

25. The non-transitory computer-readable medium of claim 21, the method further comprising:

obtaining and storing a user preference;

sorting the plurality of offers based on the user preference; and causing the plurality of promotional offers to be displayed based on the sorting.

* * * * *